3,378,528
CHLORINE - CONTAINING POLYACETAL POLYMERS AND PROCESS FOR PREPARING THEM

Hans Fernholz, Bad Soden, Taunus, and Friedrich Wunder, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 28, 1964, Ser. No. 363,276
Claims priority, application Germany, Apr. 30, 1963, F 39,626
13 Claims. (Cl. 260—67)

ABSTRACT OF THE DISCLOSURE

Chlorine-containing polymers and their preparation by copolymerizing a monocyclic ether, such as trioxane, with chloral in the presence of a catalytic amount of a completely esterified polyphosphoric acid.

---

The present invention relates to chlorine-containing polymers and a process for preparing them.

It is known that chloral can be copolymerized with cyclic acetals in the presence of cationic catalysts or Lewis acids whereby chlorine-containing polyacetals are obtained. In this manner polymers are obtained which can be separated into portions rich in chlorine and portions poor in chlorine.

Now we have found that cyclic acetals can be copolymerized with chloral in an especially advantageous manner when using as catalysts completely esterified polyphosphoric acids which may additionally contain phosphite portions and in which all acid hydrogen atoms have been replaced by alcohol groups. Different methods are known for the manufacture of the catalysts according to the invention. The catalysts are obtained most simply by reacting diphosphorus pentoxide with completely esterified orthophosphoric acid or phosphorus acid, such as trimethyl-, triethyl-, tripropyl-, tributyl-, triphenyl- or tricresylphosphate or dimethyl-, diethyl- or dipropyl phosphite. However, also the neutral polyphosphoric acid esters obtained by reacting diphosphorus pentoxide with an ether, such as diethyl ether or dipropyl ether, or by reacting phosphorus oxychloride with an alcohol or a completely esterified phosphoric acid, are suitable as catalysts for carrying out the process of the invention. The phosphorus content is of decisive importance for the activity of the catalysts used according to the invention. The polyphosphoric acid ester used as a catalyst must at least contain an excess amount of 0.01 mole diphosphorus pentoxide, calculated on one mol of the basic neutral ester used which has one phosphorus atom in the molecule. An upper limit of the phosphorus content cannot be indicated precisely since it depends essentially on the method of preparation and the type of the starting components. When diphosphorus pentoxide is reacted with triethyl phosphate, there results approximately a ratio of 100 parts by weight of diphosphorus pentoxide to 100 parts by weight of triethyl phosphate, which corresponds to an excess amount of about 1.3 mols diphosphorus pentoxide per mol of triethyl phosphate. It is advantageous to use as starting substances for the manufacture of the catalyst alkyl- or aryl esters, such for example as trimethyl- or triethyl phosphate or diethyl phosphite.

Unitary polymers are obtained when carrying out the copolymerization of chloral with cyclic acetals according to the invention with polyphosphoric acid ester as a catalyst. That unitary polymers are obtained could be proved by the fact that, for example, in the copolymerization of chloral with trioxane according to the process of the invention there are obtained copolymers with a high chlorine content that are completely soluble in benzene, while under comparable polymerization conditions with borofluoride-diethyl-etherate products are obtained which consist of portions that are rich in chlorine and soluble in benzene and of portions that are poor in chlorine and insoluble in benzene.

The catalysts or catalyst mixtures which are suitable for use in carrying out the process of the invention can be applied as such or in solution in an inert solvent, advantageously dissolved in the solvent in which the polymerization is carried out, in concentrations within the range of from 0.001 to 5 percent by weight, calculated on the monomer mixture.

For carrying out the copolymerization with chloral there are suitable the polymerizable cyclic acetals known per se, singly or in admixture with one another, such as, for example, trioxane, glycol formal, 4-chloromethyl-1,3-dioxolane, diethylene-glycol-formal, 1,4-butane-diol-formal, and other acetals. The monomer ratio of chloral to cyclic acetal can be varied within a wide range; however, for carrying out the copolymerization the chloral is advantageously used in such an amount that the resulting copolymer has a chlorine content of at least 14 up to 60 percent by weight. As the chlorine content rises, the inflammability of the products decreases. The polymerization can be carried out in the presence or in the absence of a solvent. For the polymerization process according to the invention there may be used as solvents, for example, aliphatic, cycloaliphatic and aromatic as well as halogenated hydrocarbons.

The polymers obtained by the process of the invention may be processed into valuable shaped articles of any kind which are distinguished by a difficult inflammability which is the greater the higher the chlorine content.

The following examples serve to illustrate the invention, but they are not intended to limit it thereto, the parts and percentages being by weight:

EXAMPLE 1

38 parts trioxane were mixed with 62 parts chloral (molar ratio 1:1), and 1 part ethyl polyphosphate, prepared from 100 grams diphosphorus pentoxide and 100 grams triethyl phosphate, was added to the mixture. The oil bath had a temperature of 40° C. After the reaction was complete, the polymer was dissolved in 200 parts benzene. 5 parts of a concentrated ammonia solution were added to the solution which was then extracted by agitation with 250 parts of drinking water. The benzene phase was separated from the water, the polymer was precipitated with 500 parts methanol and then washed three times with 100 parts methanol, respectively.

Yield after drying in vacuo: 57 parts of a tough, unitary, transparent, rubbery polymer containing 41% of chlorine.

EXAMPLE 2

17 parts trioxane were mixed with 83 parts chloral (molar ratio 1:3) and warmed up to 40° C. 0.5 part ethyl polyphosphate, prepared from 100 grams diphosphorus pentoxide and 100 grams triethyl phosphate, in 0.5 part chloroform was added to the mixture. After the reaction was complete, the work-up took place as described in Example 1; 48 parts of a tough, transparent, unitary polymer were obtained.

EXAMPLE 3

23 parts trioxane were mixed with 77 parts chloral (molar ratio 1:2) and warmed up to 40° C. 0.5 part ethyl polyphosphate, prepared from 100 grams diphosphorus pentoxide and 100 grams triethyl phosphate, in 10 parts methylene chloride were added to the mixture.

After the polymerization was complete, the work-up took place as described in Example 1.

Yield: 61 parts of a tough, transparent, unitary polymer.

EXAMPLE 4

38 parts trioxane were mixed with 62 parts chloral (molar ratio 1:1) and warmed up to 40° C. 0.5 part ethyl phosphite polyphosphate, prepared from 50 grams diphosphorus pentoxide and 100 grams diethyl phosphite, in 2 parts chloroform were added to the mixture. After the reaction was complete, the work-up took place as described in Example 1.

Yield: 45 parts of a unitary, tough, transparent polymer.

EXAMPLE 5

38 parts trioxane were mixed with 62 parts chloral and warmed up to 40° C. 0.5 part cresyl polyphosphate, prepared from 25 grams diphosphorus pentoxide and 100 grams tricresyl phosphate in 0.5 part chloroform was added to the mixture. After the reaction was complete, the work-up took place as described in Example 1.

Yield: 43 parts of a unitary, tough and transparent polymer.

EXAMPLE 6

50 parts diethylene glycol formal, 50 parts chloral and 0.5 part ethyl polyphosphate, prepared from 100 grams diphosphorus pentoxide and 100 grams triethyl phosphate, were mixed at 20° C. After the reaction was complete, the batch was treated as indicated in Example 1 to remove unreacted monomers and the catalyst. A unitary copolymer was obtained in a yield of 64%.

EXAMPLE 7

50 parts ethylene glycol formal, 50 parts chloral and 0.5 part ethyl polyphosphate, prepared from 100 grams diphosphorus pentoxide and 100 grams triethyl phosphate, were polymerized and worked up as described in Example 6. A unitary copolymer was isolated in a yield of 48%.

We claim:

1. A process for the manufacture of a chlorine-containing polymer by polymerizing a monocyclic ether with chloral in the presence of a catalyst at temperatures within the range of from −70° to +150° C. which comprises using, as a catalyst, a completely alkyl- or aryl-esterified polyphosphoric acid containing an excess of at least 0.01 mol $P_2O_5$ per mol of ester.

2. A process as claimed in claim 1, wherein the catalyst used is an ester of polyphosphoric acid containing phosphite portions.

3. A process as claimed in claim 1, wherein the polyphosphoric acid ester is a completely alkyl-, phenyl- or cresyl-esterified polyphosphoric acid at least 0.01 mol of diphosphorus pentoxide per mol of monophosphoric acid.

4. A process as claimed in claim 2, wherein the polyphosphoric acid ester contains at least 0.01 mol of diphosphorus pentoxide per mol of monophosphoric and monophosphorus acid.

5. A process as claimed in claim 1, wherein the catalyst is applied in an amount ranging from 0.01 to 5 percent by weight, calculated on the mixture of monocyclic ether and chloral.

6. A process as claimed in claim 2, wherein the catalyst is applied in an amount ranging from 0.01 to 5 percent by weight, calculated on the mixture of monocyclic ether and chloral.

7. In a process for catalytically copolymerizing a monocyclic ether with chloral, the improvement which comprises carrying out the copolymerization at a temperature from −70° to +150° C. in the presence of a catalytic amount of a completely alkyl- or aryl-esterified polyphosphoric acid containing an excess of at least 0.01 mol $P_2O_5$ per mol of ester.

8. In a process for catalytically copolymerizing a monocyclic ether with chloral, the improvement which comprises carrying out the copolymerization at a temperature from −70° to +150° C. in the presence of a catalytic amount of a catalyst prepared from a trialkyl-, triphenyl- or tri-cresylphosphate, a dialkylphosphite or a dialkyl ether and at least 0.01 mol $P_2O_5$ per mol of phosphorus in said phosphate or phosphite.

9. A process as defined in claim 7 wherein the catalytic amount is between about 0.01 and 5 percent by weight of the monocyclic ether and chloral monomers.

10. A process as defined in claim 7 wherein the monocyclic ether is trioxane.

11. A process as defined in claim 8 wherein the catalyst is an ethyl polyphosphate prepared from triethyl phosphate and $P_2O_5$.

12. A process as defined in claim 8 wherein the catalyst is an ethyl phosphite polyphosphate prepared from diethyl phosphite and $P_2O_5$.

13. A process as defined in claim 8 wherein the catalyst is a cresyl polyphosphate prepared from tricresyl phosphate and $P_2O_5$.

References Cited

UNITED STATES PATENTS

| | | | |
|---|---|---|---|
| 2,989,511 | 6/1961 | Schnizer | 260—67 |
| 3,272,780 | 9/1966 | Wilson et al. | 260—73 |

FOREIGN PATENTS

| | | |
|---|---|---|
| 902,602 | 8/1962 | Great Britain. |

WILLIAM H. SHORT, *Primary Examiner.*

L. M. PHYNES, *Assistant Examiner.*